(12) United States Patent
Zukouski et al.

(10) Patent No.: US 6,378,487 B1
(45) Date of Patent: Apr. 30, 2002

(54) METHOD AND APPARATUS FOR PRE-PILOT FUEL INJECTION IN DIESEL INTERNAL COMBUSTION ENGINES

(75) Inventors: Russell P. Zukouski, Bolingbrook; Xinqun Gui, Lisle, both of IL (US)

(73) Assignee: International Truck and Engine Corporation, Warrenville, IL (US)

( * ) Notice: Subject to any disclaimer, the term of this patent is extended or adjusted under 35 U.S.C. 154(b) by 0 days.

(21) Appl. No.: 09/653,469

(22) Filed: Sep. 1, 2000

(51) Int. Cl.[7] .......................... F02B 17/00; F02D 41/38
(52) U.S. Cl. ...................... 123/299; 123/480; 123/305; 123/435; 123/295
(58) Field of Search .................. 123/299, 300, 123/305, 295, 435, 436, 478, 480

(56) References Cited

U.S. PATENT DOCUMENTS

| | | |
|---|---|---|
| 4,399,786 A | 8/1983 | Holmer |
| 4,590,903 A | 5/1986 | Hofmann et al. |
| 4,700,672 A | 10/1987 | Baguena |
| 4,704,999 A | 11/1987 | Hashikawa et al. |
| 5,119,780 A | 6/1992 | Ariga ......................... 123/300 |
| 5,243,932 A | 9/1993 | Herrmann |
| 5,482,016 A | 1/1996 | Ohishi et al. |
| 5,697,342 A | 12/1997 | Anderson, et al. |
| 5,711,865 A | 6/1998 | Ishida |
| 5,801,308 A | 9/1998 | Hara |
| 5,884,602 A | 3/1999 | Friedrich et al. |
| 5,893,347 A | 4/1999 | McGee et al. |
| 5,924,403 A | 7/1999 | Thomas |
| 6,029,628 A | 2/2000 | Oleksiewicz et al. |
| 6,062,189 A | 5/2000 | Kaneko et al. .............. 123/295 |
| 6,085,726 A | 7/2000 | Lei et al. |
| 6,164,264 A | 12/2000 | Thomas |
| 6,240,724 B1 | 6/2001 | Kudou et al. ................ 123/478 |

FOREIGN PATENT DOCUMENTS

| | | | |
|---|---|---|---|
| JP | 11-141386 | 5/1999 | ........... F02D/41/38 |
| JP | 11-148410 | 6/1999 | ........... F02D/41/38 |
| JP | 2000-97077 | 4/2000 | ........... F02D/41/06 |

*Primary Examiner*—Henry C. Yuen
*Assistant Examiner*—Hieu T. Vo
(74) *Attorney, Agent, or Firm*—Giberto Hernandez; Dennis Kelly Sullivan; Jeffrey P. Calfa

(57) ABSTRACT

A method and apparatus for injecting fuel into a diesel engine combustion chamber is provided wherein a pre-pilot injection is injected sufficiently prior to critical mass conditions being achievable to permit vaporization and formation of a substantially homogenous mixture before a critical mass exists. Preferably, a pilot injection is injected after the pre-pilot injection but at or before a point wherein a critical mass based on the pre-pilot quantity. This will result in a reduced heat release rate will result in a slower, smoother and more controlled build up of pressure in a combustion chamber and thereby advantageously reduce combustion noise.

28 Claims, 8 Drawing Sheets

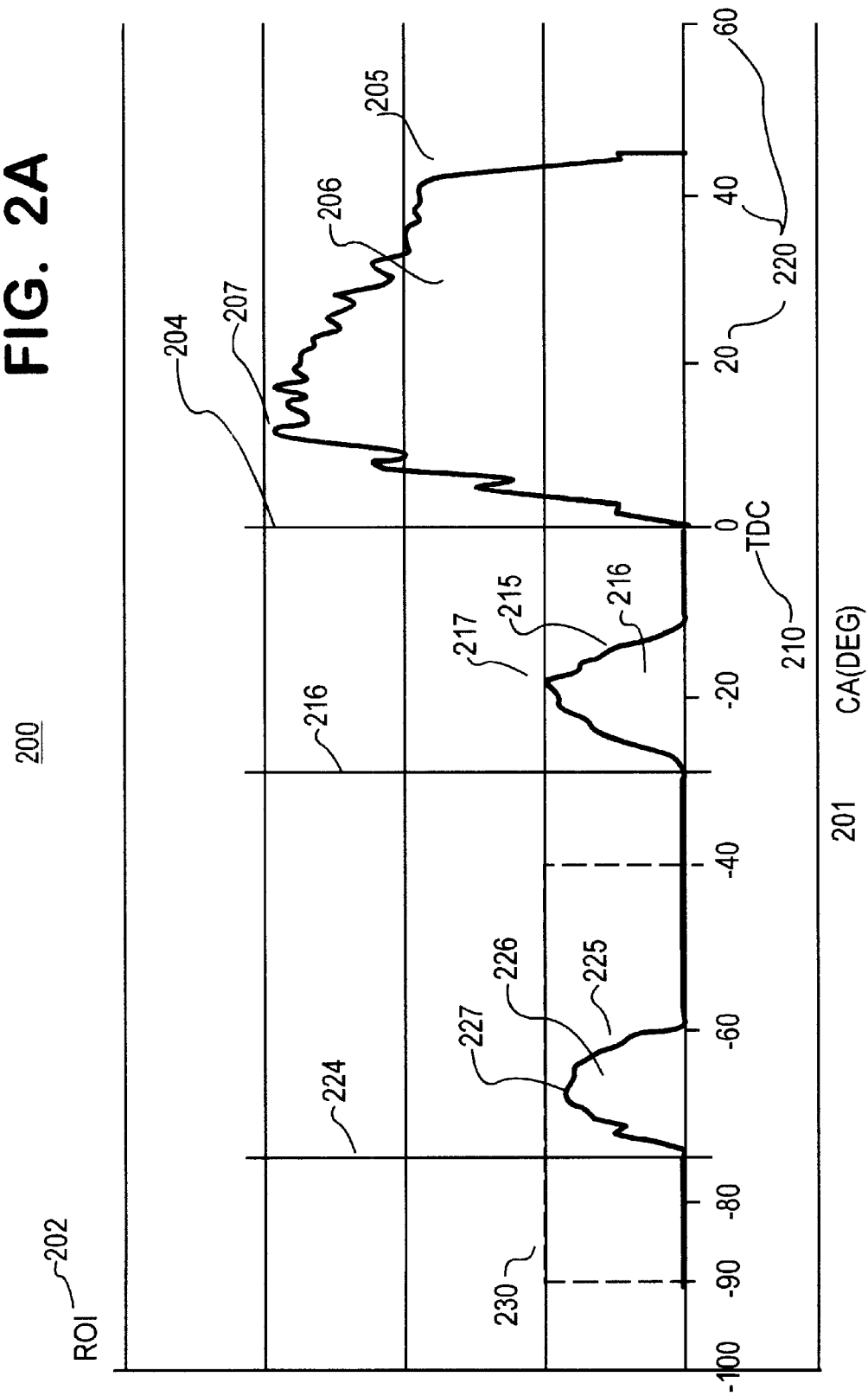

METHOD AND APPARATUS FOR PRE-PILOT FUEL INJECTION IN DIESEL INTERNAL COMBUSTION ENGINES

FIELD OF THE INVENTION

This invention relates generally to internal combustion engine fuel systems, and more particularly to the use of fuel injectors to advantageously control combustion chamber pressure through the use of multiple pilot injections.

BACKGROUND OF THE INVENTION

It is common practice, in diesel internal combustion engines, to divide the fuel injected into the combustion chamber into two injections within the same injection cycle. The reasons for using two injections include to reduce ignition delay, to reduce the generation of nitrogen oxides, and lower combustion noise. It is commonly known that the two injections achieve a reduction of the combustion chamber pressure or cylinder pressure gradient and consequently a slower buildup of pressure in the combustion chamber.

The first or initial injection is typically known as a pilot injection, while the subsequent injection is commonly called a main injection. This two injection approach or process is known, by those of skill in the art, by various names including Split Shot injection, pilot injection, single pilot injection, pilot-main injection, and multiple injection. Additionally, a similar process known as rate shaping involves providing a small fuel quantity during the initial portion of the main injection.

In the pilot injection method, a pilot injection first delivers a small quantity of fuel into the combustion chamber during a predetermined period typically before Top Dead Center (TDC). An ensuing stage delivers the main or primary injection into the combustion chamber. The pilot injection is typically initiated about 25° before TDC, while the main injection is typically delivered at about TDC.

However, even the current pilot-main injection approach still results in noticeable combustion noise due to high heat release rates and a high cylinder pressure increase rate. This is especially the case during engine idle conditions. In attempts to reduce combustion noise, some have varied the amount of fuel in the pilot injection and/or have tried to vary the timing of the injection point of the pilot injection. However, even with these methods, combustion noise levels remain high. There is thus a need for a fuel injection method and apparatus that will noticeably reduce combustion noise in a diesel engine at various engine conditions and load levels, including engine idling conditions.

SUMMARY OF THE INVENTION

The present invention substantially reduces diesel combustion noise through the introduction of a pre-pilot fuel injection into the combustion chamber at a predetermined time, during a single compression stroke in an engine cycle, i.e., during a single injection cycle, prior to the point where a critical mass would be formed in the cylinder if the injection were made and prior to the pilot and main injection shots. Critical mass is the state in the combustion process wherein all the conditions, including localized air/fuel mixture, temperature and pressure, necessary to support explosive combustion or uncontrolled heat release exist in the combustion chamber. The pre-pilot fuel injections are accomplished through execution of a pre-pilot injection algorithm by an electronic control module which will manipulate existing injectors and injector controls to deliver a pre-pilot fuel injection prior to the pilot injection at a predetermined optimum time before top dead center (TDC).

The injected pre-pilot fuel vaporizes in the combustion chamber and mixes with the air to form a substantially homogenous air/fuel mixture in the combustion chamber prior to the time that the critical mass may be formed. Preferably, at about the point where the cylinder conditions including the pre-pilot shot would reach a critical mass, the pilot fuel may be injected. This pilot shot has the effect of quenching the pre-pilot mixture in the cylinder and altering the conditions in the cylinder so that a critical mass no longer exists for an additional period. The result is that the fuel combusts or burns in a non-explosive and controlled manner such that the heat release rate of the pre-pilot fuel will begin to increase the cylinder pressure in a continuous and smooth manner. The subsequent pilot/main injection will then result in a smooth pressure rise in the combustion chamber due to the presence of increased pressure resulting from the controlled heat release of the pre-pilot injection. The combination of the pre-pilot injection in combination with the well known pilot/main injection results in a smoother and more controlled cylinder pressure rise as the piston travels from a compression stroke through a power stroke. The sudden cylinder pressure rise typically observed in a combustion chamber where there is only a pilot and/or main injection, is substantially eliminated leading to reduced combustion noise.

It is an object of the present invention to provide a method and apparatus for operating an internal combustion engine fuel injection system to provide a pre-pilot injection in order to achieve a reduction in the heat release rate in a combustion chamber that results in a slower, smoother and more controlled build up of cylinder pressure thereby a reduction in ambient combustion noise.

It is an object of the present invention to provide a method and apparatus for operating an internal combustion engine fuel injection system to provide the injection of a pre-pilot fuel injection in order to achieve a reduction in the cylinder pressure increase rate or pressure gradient in a combustion chamber that results in a slower, smoother and more controlled build up of pressure in a combustion chamber and thereby a reduction in combustion noise.

A more specific object of the present invention to provide a method and apparatus for operating an internal combustion engine fuel injection system to provide the injection of a pre-pilot fuel injection in combination with a pilot injection and a main injection wherein the pre-pilot injection is injected during a portion of the compression cycle under cylinder conditions permitting homogenous mixing of the pre-pilot shot prior to combustion in order to achieve a reduction in the cylinder pressure increase rate or pressure gradient in a combustion chamber that results in a slower, smoother and more controlled build up of pressure in a combustion chamber and thereby a reduction in combustion noise.

In addition to the reduction in combustion noise, the invention provides the further advantage that peak cylinder pressure is substantially reduced when pre-pilot injection is used. Since the peak cylinder pressure is a major determinant of the structural design of an engine, in existing engines, the power output or power density may be increased without a structural penalty and new engines may be designed with a lighter weight structure for the same power output or power density.

BRIEF DESCRIPTION OF THE DRAWINGS

FIG. 2A is an exemplary engine injection cycle plot depicting an embodiment of a pre-pilot injection of the present invention relative to the known pilot and main fuel injections.

DESCRIPTION OF THE PREFERRED EMBODIMENT

The present invention provides a method and apparatus for delivering a pre-pilot injection into a combustion chamber during a compression stroke, in order to achieve a reduction in the heat release rate and the cylinder pressure increase rate in the combustion chamber. The pre-pilot injection results in a slower, smoother and a more controlled build up of pressure in the combustion chamber and thereby advantageously reduces combustion noise.

Figure 1:
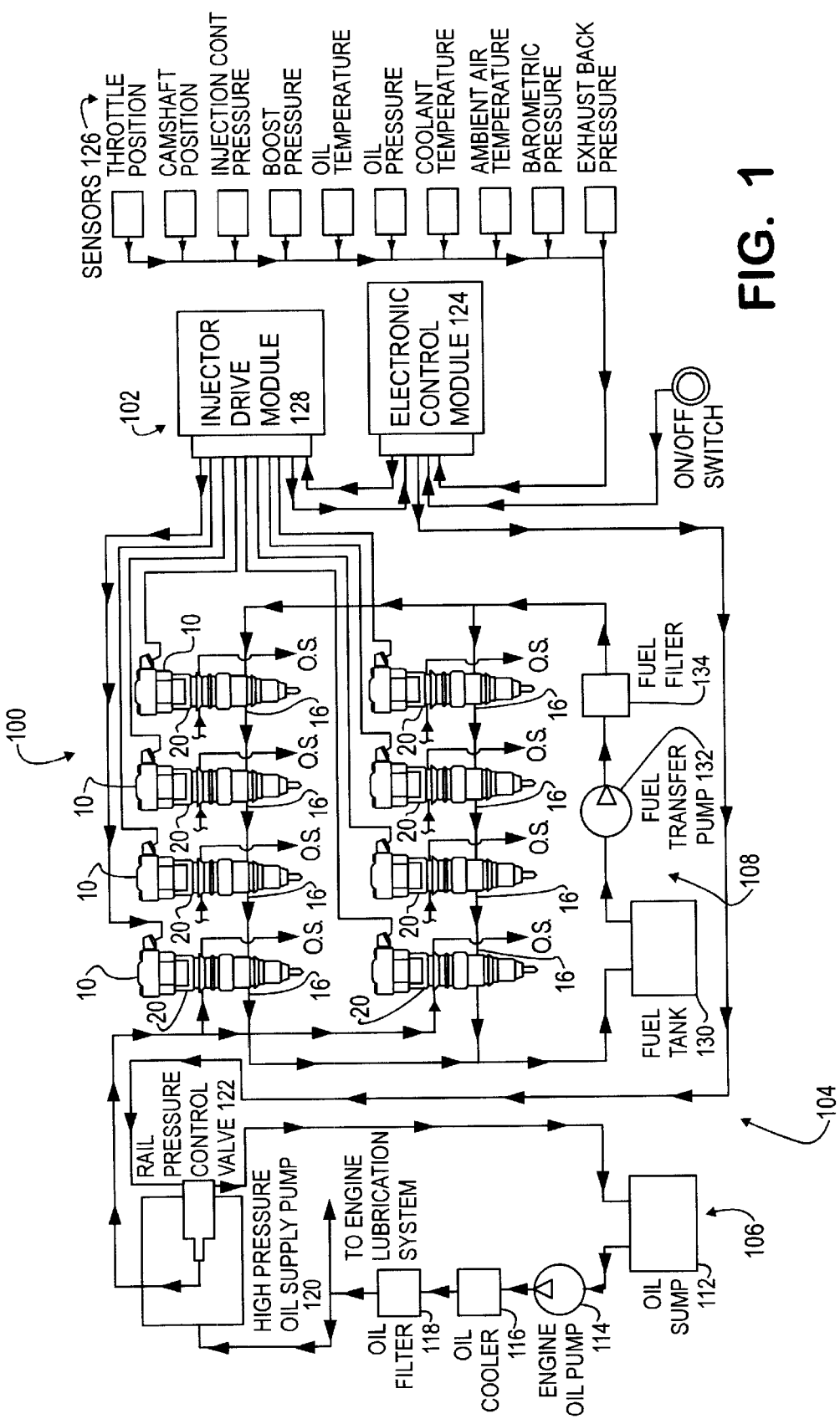
FIG. 1 depicts a general schematic diagram of a fuel injection system for a multi-cylinder, compression-ignition internal combustion engine with fuel injectors and control systems therefor for implementing the present invention.

FIG. 1 shows a general schematic diagram of an exemplary fuel injection system 100 for a multi-cylinder, compression-ignition internal combustion engine with fuel injectors where embodiments of the present invention could be implemented. The fuel injection system 100 shown has eight fuel injectors 10, each associated with a respective cylinder or combustion chamber of a representative eight-cylinder, compression-ignition internal combustion engine of the type that typically powers an automotive vehicle. System 100 includes an electronic control portion 102 and a fluid-handling portion 104. The fluid-handling portion 104 comprises two distinct fluid handling circuits associated with the fuel injectors 10: a first hydraulic actuation fluid handling circuit, such as engine oil circuit 106 (although other actuating fluids including fuel are possible) and a second fluid handling circuit, namely a liquid fuel circuit 108.

In engine oil circuit 106, engine oil is drawn from an oil sump 112 by an engine oil pump 114 and pumped through an oil cooler 116 and an oil filter 118 to an inlet of a high pressure oil supply pump 120. The high pressure oil supply pump 120 is powered by the engine to pressurize the oil to a pressure within a range that may extend, for example, from about 450 psi to about 3,000 psi. A rail pressure control valve 122 pressure-regulates oil that is pumped by the high pressure oil supply pump 120 to a pressure determined by an electric current supplied to it by an engine control module (ECM) 124 that forms a part of electronic control portion 102. That current is developed through the use of executable algorithms embedded in the ECM 124 to process selected input parameters, which may include various engine operating parameters such as those received from certain sensors 126 (sensors collectively referenced as 126 in FIG. 1). The high pressure oil is supplied to a high pressure rail in a corresponding cylinder head of the engine so as to be constantly available at the respective oil supply ports 20 of the fuel injectors 10 in the respective rail. The engine shown herein as an example is a V-type having two such rails, each serving four engine cylinders.

Electronic control portion 102 further comprises an injector drive module (IDM) 128 operatively associated with the electronic control module (ECM) 124 and fuel injectors 10. The ECM 124 supplies signals for selectively operating fuel injectors 10 in accordance with internally programmed and executable algorithms processing certain engine operating parameters. When a particular fuel injector 10 is to be operated to inject fuel into its corresponding engine cylinder or combustion chamber, the ECM 124 provides an appropriate pulse width signal to the IDM 128 as well as a desired rail pressure signal to the rail pressure control valve 122 depending on the engine speed and load. The IDM 128 then signals the appropriate fuel injector 10, causing an injection to occur. Those of skill in the art will appreciate that the signals which are supplied to the fuel injectors 10 control certain characteristics of the fuel injections in accordance with the engine control strategy program into the ECM. Charging of the fuel injectors with liquid fuel occurs from a fuel supply circuit 108 between injections.

Fuel circuit 108 comprises a fuel tank 130 for holding a supply of liquid fuel for the engine. A fuel transfer pump 132 draws fuel from the fuel tank 130 and pumps it through a fuel filter 134 and respective fuel rails that serve the fuel injectors 10 in the respective cylinder heads to the fuel supply ports 16 of the fuel injectors 10. The fuel circuit 108 may include return passages for returning excess fuel from the fuel injectors 10 to the fuel tank 130. It will be readily appreciated that a similar fuel system could be used on in-line diesel engines. It will be appreciated that the foregoing is a description of a hydraulically-actuated electronically-controlled unit injector (HEUI) fuel system of the type described, for example, in U.S. Pat. No. 5,720,261 which is incorporated by reference herein.

FIG. 2A illustrates an exemplary plot 200 of a single injection cycle of an engine incorporating a pre-pilot injection 225 of the present invention, a typical pilot injection 215 and a typical main fuel injection 205. The plot 200 describes rate of injection (ROI) along the vertical axis against crank angle rotation in degrees 220 along its horizontal axis from 100° before top dead center (TDC) 210 on the compression stroke to 60° after TDC on the power stroke. The injection points or injection timing of the main 205, pilot 215 and pre-pilot injections 225 are described with reference to TDC.

As shown in the drawing, the pre-pilot shot 225 is injected prior to the typical pilot shot 215. The pilot shot 215 typically begins to be injected during a compression stroke at a predetermined crank angle before top dead center (BTDC) and prior to the main injection 205 as shown in FIG. 2A. The pre-pilot shot 225 and the pilot shot 215 typically are both a substantially smaller quantity 216, in the range of about 0.5–5 mm³, compared to the subsequent main injection fuel quantity 206 which may be as much as 50–300 mm³. The main injection 205 may be injected before or after TDC, however, it is typically injected after top dead center (ATDC). The plot 200 of FIG. 2A indicates that the pilot shot 215 and the main injection 205 were injected at 25° BTDC and about TDC respectively.

The present embodiment contemplates that the pre-pilot shot 225 is a fuel injection that is in addition to, and separate from, the known pilot injection 215 and main injection 205, or from a combined pilot/main injection if rate shaping is employed. For reasons to be discussed below, the pre-pilot shot 225 must be injected within a predetermined injection window or range 230 during the compression stroke that is substantially before TDC because the pre-pilot injection must be able to form a substantially homogenous mixture in the cylinder before combustion occurs. Rather than experiencing explosive, uncontrolled combustion as the prior art pilot shot and main injection configuration do upon their injection, the injected pre-pilot fuel having formed a homogenous mixture combusts in a non-explosive and controlled manner such that the heat release is substantially delayed and the heat release rate is reduced. The reduced heat release rate in turn results in a reduced cylinder pressure increase rate. The reduced pressure increase rate in turn results in a smoother and more controlled rise in the cylinder pressure as the piston transitions from the compression stroke to the power stroke.

Combustion of the pre-pilot injection does not occur upon injection because the injection is so early in the cycle that the combustion chamber conditions, including local air/fuel mixture, pressure, and temperature, i.e., a critical mass, necessary to support explosive or uncontrolled heat release in a diesel engine, do not exist in the window 230 since the combustion chamber volume is large because the piston is not near the top of the stroke. Rather the fuel from the pre-pilot shot is vaporized, mixes into a homogenous air/fuel mixture in the combustion chamber, and relatively slowly dissociates as the pressure and temperature continue to increase until a critical mass is achieved resulting in a delayed and controlled heat release. The pre-pilot injection window 230 preferably spans a range of about 90° BTDC to about 40° BTDC. The particular limits may vary from engine to engine depending on the compression ratio, etc. The beginning of the range is defined by the pressure and temperature conditions in the cylinder which are sufficiently high to vaporize the injected fuel and keep it in a vapor state. The end of the range is defined as a point providing sufficient time for the pre-pilot injection to achieve a substantially homogenous air/fuel mixture in the cylinder before a critical mass exists.

An important aspect of the invention is that the pre-pilot injection may be used in combination with an appropriately timed pilot injection 215 or combined pilot/main injection. In this regard, the injection of the pilot shot 215 has the effect of quenching the pre-pilot mixture at a point where the pre-pilot mixture might otherwise experience explosive combustion due to the cylinder conditions reaching critical mass or becoming more conducive to explosive combustion as the piston moves toward TDC. Accordingly, the controlled heat release from the pre-pilot shot may continue for an additional period corresponding to the ignition delay from the pilot shot 215. Consequently, the pilot shot 215 should be injected at or before the point where the pre-pilot mixture would reach a critical mass.

Reduced engine combustion noise will be observed, so long as the pre-pilot injection 225 is delivered within the pre-pilot injection window 230. The plot 200 of FIG. 2A indicates that a pre-pilot fuel quantity 226 was delivered by the pre-pilot injection 225 within the pre-pilot injection window 230 at 70° BTDC. Further, as required, the pre-pilot shot was prior to a pilot injection 215 and main injection 205 which were injected at 25° BTDC, the approximate critical mass point for this engine, and about TDC, respectively. The series of fuel injections in this embodiment of the present invention, as shown in FIG. 2A, will result in a slower, smoother and more controlled build up of pressure in the combustion chamber and thereby advantageously reduce combustion noise.

Figure 2B:
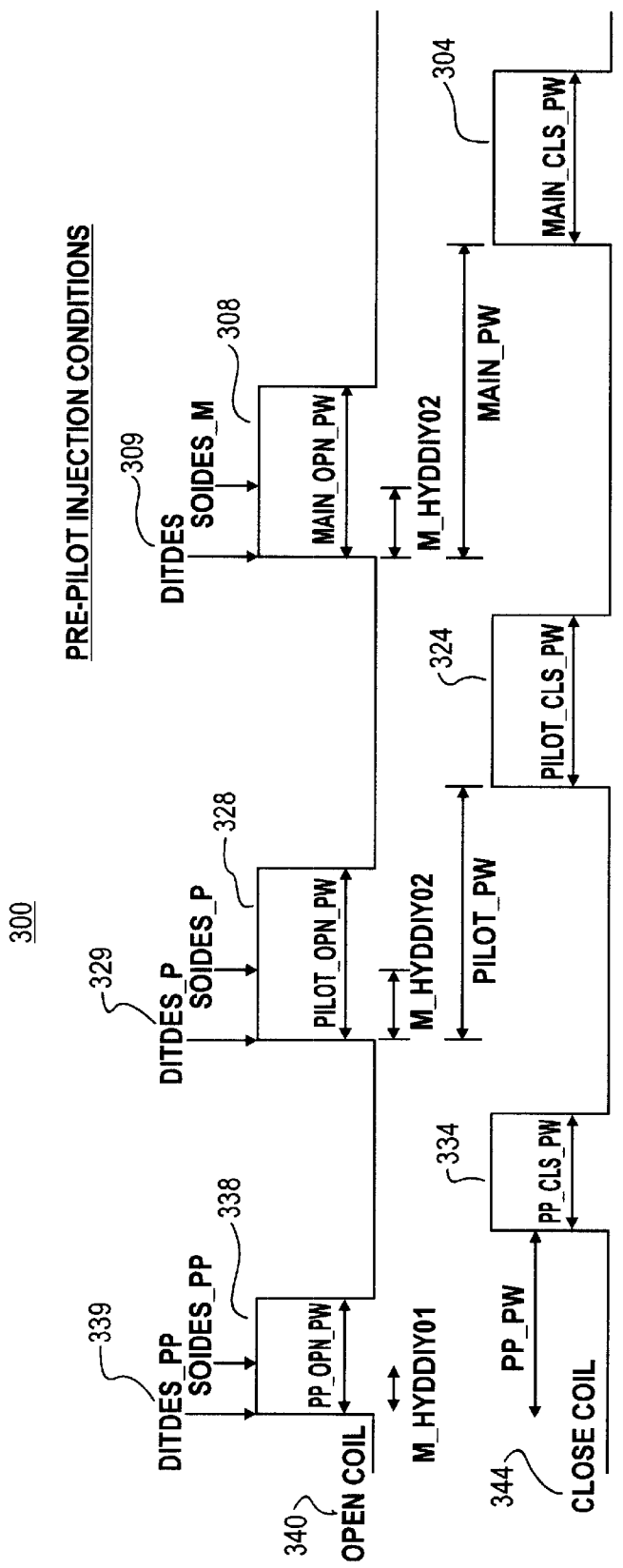
FIG. 2B is a timing diagram of an electronic control signal implementing a prepilot injection of the present invention and the known pilot and main fuel injections.

FIG. 2B illustrates a corresponding timing diagram 300 for the control signal to cause the injector 10 to execute the pre-pilot injection 225, and the known pilot 215 and main fuel 205 injections shown in FIG. 2A. The injector 10 described in U.S. Pat. No. 5,720,261 has a spool type control valve (not shown) wherein the spool movement is controlled by a first solenoid open coil(not shown) to open the control valve and cause injection. The spool stays in the open position until a second solenoid close coil(not shown) is activated to close the control valve to end the injection. To carry out the pre-pilot injection 225, an open coil signal 340 is sent by the IDM 128 in the form of a pre-pilot open pulse width (pp-opn-pw) 338 to the open coil in a particular injector 10 (shown in FIG. 1) which energizes the open coil and permits injection. The timing of when the pre-pilot fuel injection begins (ditdes-pp) 339 is directly correlated to the pre-pilot injection point 224 within the pre-pilot injection window shown in FIG. 2A. At the appropriate point determined by the quantity of fuel desired, a close coil signal 344 is sent to the close coil to terminate the pre-pilot injection 225 in the form of a pre-pilot close pulse width (pp-cls-pw) 334.

A corresponding pair of pilot injection open 328 and close 324 pulse widths ensure that the pilot injection 215 is delivered subsequent to the pre-pilot injection 225. The timing of the pilot fuel injection desired (ditdes-p) 329 is similarly correlated to the pilot injection point 216 shown in FIG. 2A. Further, a corresponding pair of main injection open 308 and close 304 pulse widths ensure that the main injection 205 is delivered subsequent to the pilot injection 215. As before, the timing of the main fuel injection desired (ditdes-p) 309 is similarly correlated to the main injection point 216 shown in FIG. 2A.

Figure 3A:
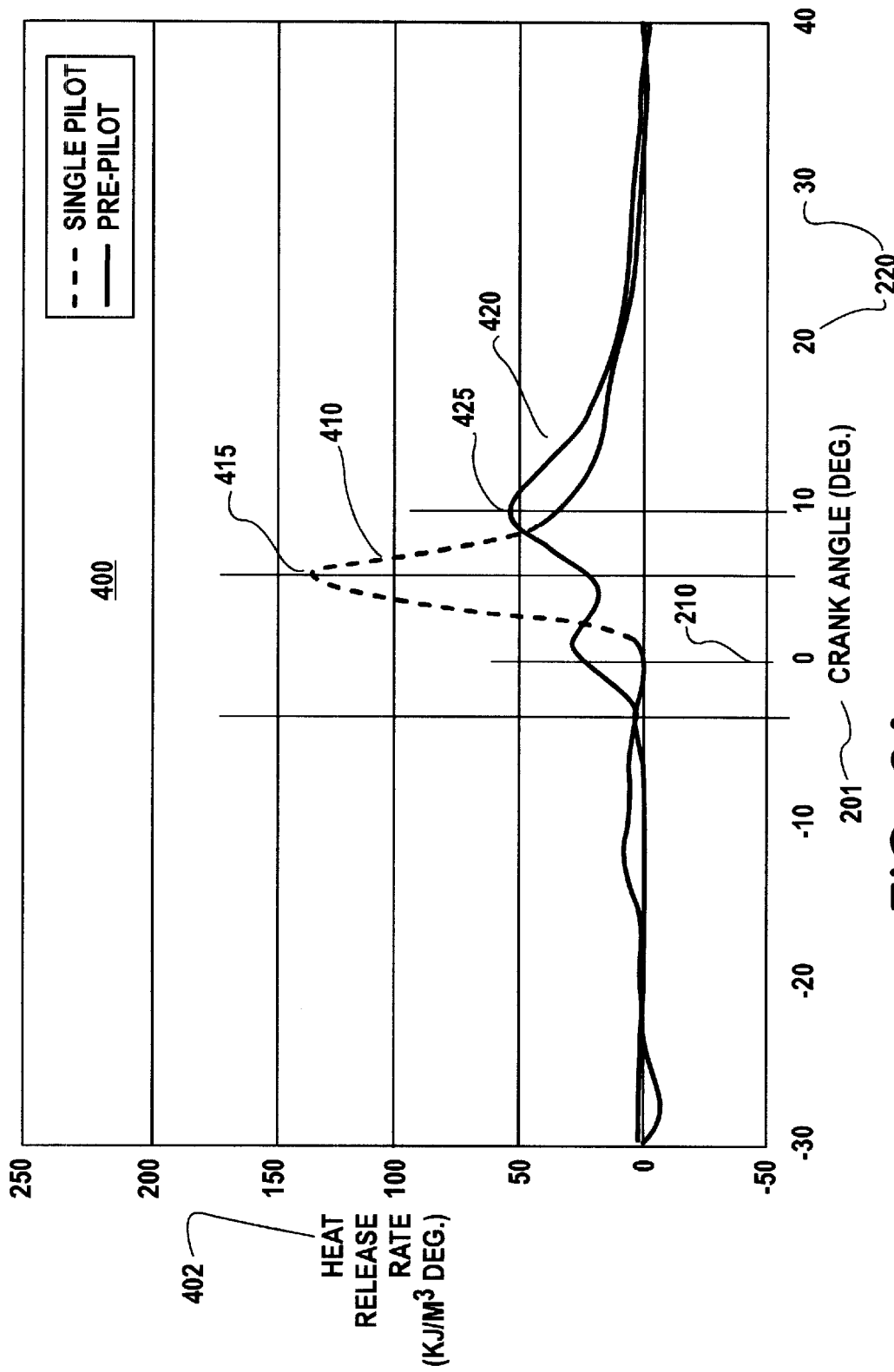
FIG. 3A shows an exemplary engine cycle plot depicting heat release rate curves at 800 rpm and 100 ft-lb. for an embodiment of the pre-pilot injection of the present invention and for a pilot and main fuel injection.

FIG. 3A illustrates an exemplary plot 400 depicting heat release rate curves 410 and 420 occurring in a combustion chamber with the typical single pilot 215 and main 205 injection of the prior art, and with the pre-pilot 225, pilot 215 and main injection 205 of the present invention. As in FIG. 2A, the pre-pilot injection 225 was injected at 70° BTDC, pilot injection 215 was injected at 25° BTDC and the main injection 205 was injected at about TDC. The resultant curves were obtained at an engine speed and load of 800 rpm and 100 ft-lb. which are engine idle conditions. Idle conditions are shown since engine combustion noise is typically most conspicuous to a user during idling. However, the pre-pilot injection 225 method of the present invention is intended to be used at high, medium and low engine loads and speeds, in addition to idle.

The single pilot heat release rate curve 410 (resulting from a pilot and main injection) exhibits a dramatic and sharp heat release rate increase compared to the pre-pilot heat release rate curve 420 (resulting from a pre-pilot, pilot and main injection). For example, the single pilot heat release rate curve 410 exhibits a heat release rate of zero (kJ/m³deg) at the TDC point 210 and a maximum heat release rate of about 140 (kJ/m³deg) at approximately 5° ATDC, and then a subsequent decrease to about 40 (kJ/ m³deg) at about 10° ATDC. In contrast, the heat release rate curve 420 with pre-pilot injection shows a significantly smaller variation in the heat release rate over the same crank angle range, i.e., between TDC, and 5 and 10° ATDC.

A variation in the heat release rate is expected during this crank angle range since it is typically at this point that the main injection is delivered into the combustion chamber for a power stroke. This is shown clearly in FIG. 2A where the main injection 205 is preferably delivered at about TDC. However, there is a significant reduction in the heat release rate between the single pilot heat release rate curve 410 and the pre-pilot heat release rate curve 420 of the present invention. In comparison to the pilot heat release curve 410, the delivery of a pre-pilot injection 225 during the compression stroke and before the pilot injection 215 has dramatically reduced the heat release rate in the combustion chamber as the piston therein travels from about 5° BTDC to about 10° ATDC, i.e., during the compression to power stroke in the engine cycle.

Thus, using a pre-pilot injection, as contemplated by the present invention, results in a maximum heat release rate 425 of about 51 (kJ/m³deg) between about 5° BTDC to about 10° ATDC. In contrast, without the pre-pilot injection, i.e., only a pilot/main injection, there results a maximum heat release rate 415 of about 140 (kJ/m³deg) between about TDC 210 and about 5° ATDC. The pre-pilot fuel which was injected at 70° in accordance with the invention produces no heat release prior to 30 BTDC. Between 30 BTDC and about 22 BTDC, there is a cool down period as the fuel is vaporized and mixed. Thereafter, there is a heat release at a low rate and in a non-explosive and controlled manner across about 15 until the effect of the pilot shot and the main shot occurs with heat release rates well below those experienced without the pre-pilot injection. This significant reduction in heat release rate results in a smoother pressure rise in the combustion chamber as the piston transitions from the compression stroke to the power stroke (shown and discussed in FIG. 3C). The smoother cylinder pressure rise in turn results in reduced combustion noise (shown and discussed in FIG. 3D).

Figure 3B:
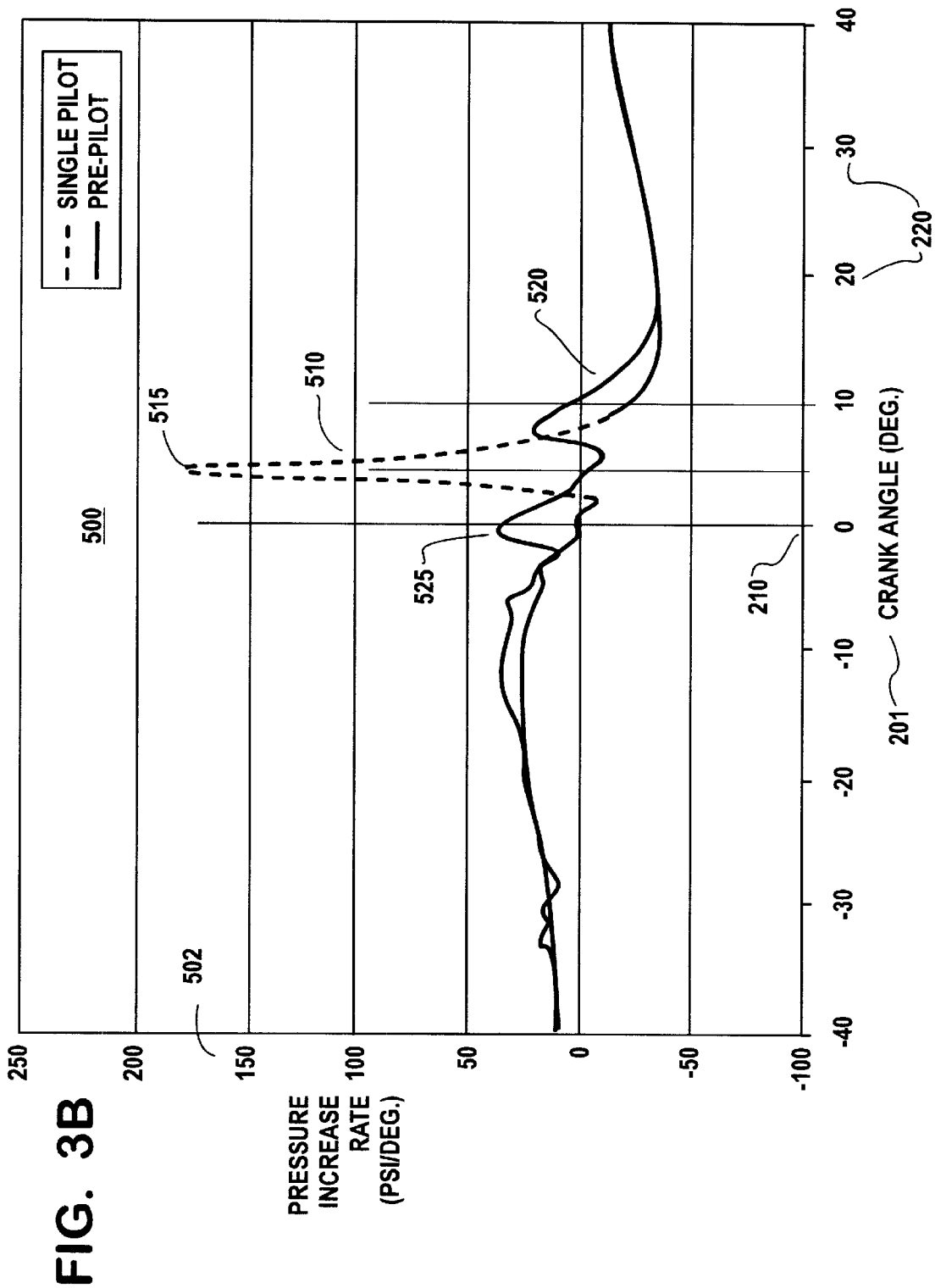
FIG. 3B shows an exemplary plot depicting cylinder pressure rate curves at 800 rpm and 100 ft-lb. for an embodiment of the pre-pilot, pilot, and main fuel injection of the present invention and for a pilot and main fuel injection.

FIG. 3B illustrates an exemplary plot 500 comparing cylinder pressure increase rate curves 510 and 520 that occur in a combustion chamber from the typical single pilot 215 and main 205 injection method of the prior art and the pre-pilot 225, pilot 215 and main injection 205 method of the present invention. As in the previous Figures, the pre-pilot pilot injection 225 was injected at 70° BTDC, pilot injection 215 was injected at 25° BTDC and the main injection 205 was injected at about TDC. The resultant curves were again obtained at an engine speed and load of 800 rpm and 100 ft-lb. or engine idle conditions since engine combustion noise is typically most conspicuous to a user during idling. However, the pre-pilot injection 225 method of the present invention is intended to be used at high, medium and low engine loads and speeds, in addition to idle.

The single pilot pressure increase rate curve 510 (resulting from a pilot and main injection) exhibits a dramatic and sharp increase in pressure increase rate compared to the pre-pilot pressure increase rate curve 520 (resulting from a pre-pilot, pilot and main injection). For example, the single pilot pressure increase rate curve 510 exhibits a pressure increase rate of zero (psi/deg) at the TDC point 210 and a maximum pressure increase rate of about 175 (psi/deg) at approximately 5° ATDC, and then a subsequent decrease to about −25(psi/deg) at about 10° ATDC. In contrast, the pre-pilot pressure increase rate curve 520 shows a significantly smaller variation in the pressure increase rate over the same crank angle range 220, i.e., between TDC 210, and 5 & 10° ATDC.

As before, a variation in the pressure increase rate is expected as the main injection is delivered into the combustion chamber for a power stroke. However, there is a significant reduction in the pressure increase rate between the pilot pressure increase rate curve 510 and the pre-pilot pressure increase rate curve 520 of the present invention. In comparison to the single pilot pressure increase curve 510, the delivery of a pre-pilot injection 225 during the compression stroke and before the pilot injection 215 has again dramatically reduced the pressure increase rate in the combustion chamber as the piston therein travels from TDC 210 to about 10° ATDC, i.e., during the power stroke in the engine cycle.

Thus, using a pre-pilot injection, as contemplated by the present invention, actually results in a reduced pressure increase rate 525 from about 40 (psi/deg) at about TDC 210 to about 20 (psi/deg) at about 10° ATDC. In contrast, without the pre-pilot injection, i.e., only a pilot/main injection, there results a maximum pressure increase rate 515 of about 175 (psi/deg) between about TDC 210 and about 5° ATDC. This significant reduction in pressure increase rate is obtained by the addition of a pre-pilot injection and again results in a smoother pressure rise in the combustion chamber as the piston transitions from the compression stroke to the power stroke (shown and discussed in FIG. 3C). The injected pre-pilot fuel is burned in the combustion chamber in a non-explosive and controlled manner such that the heat release rate is reduced. The reduction in heat release rate, which directly affects the cylinder pressure, in turn leads to a significantly reduced pressure increase rate. The pre-pilot fuel injection thus results in a smoother pressure rise in the combustion chamber as the piston transitions from the compression stroke to the power stroke (shown and discussed in FIG. 3C). The smoother cylinder pressure rise then results in reduced combustion noise (shown and discussed in FIG. 3D).

Figure 3C:
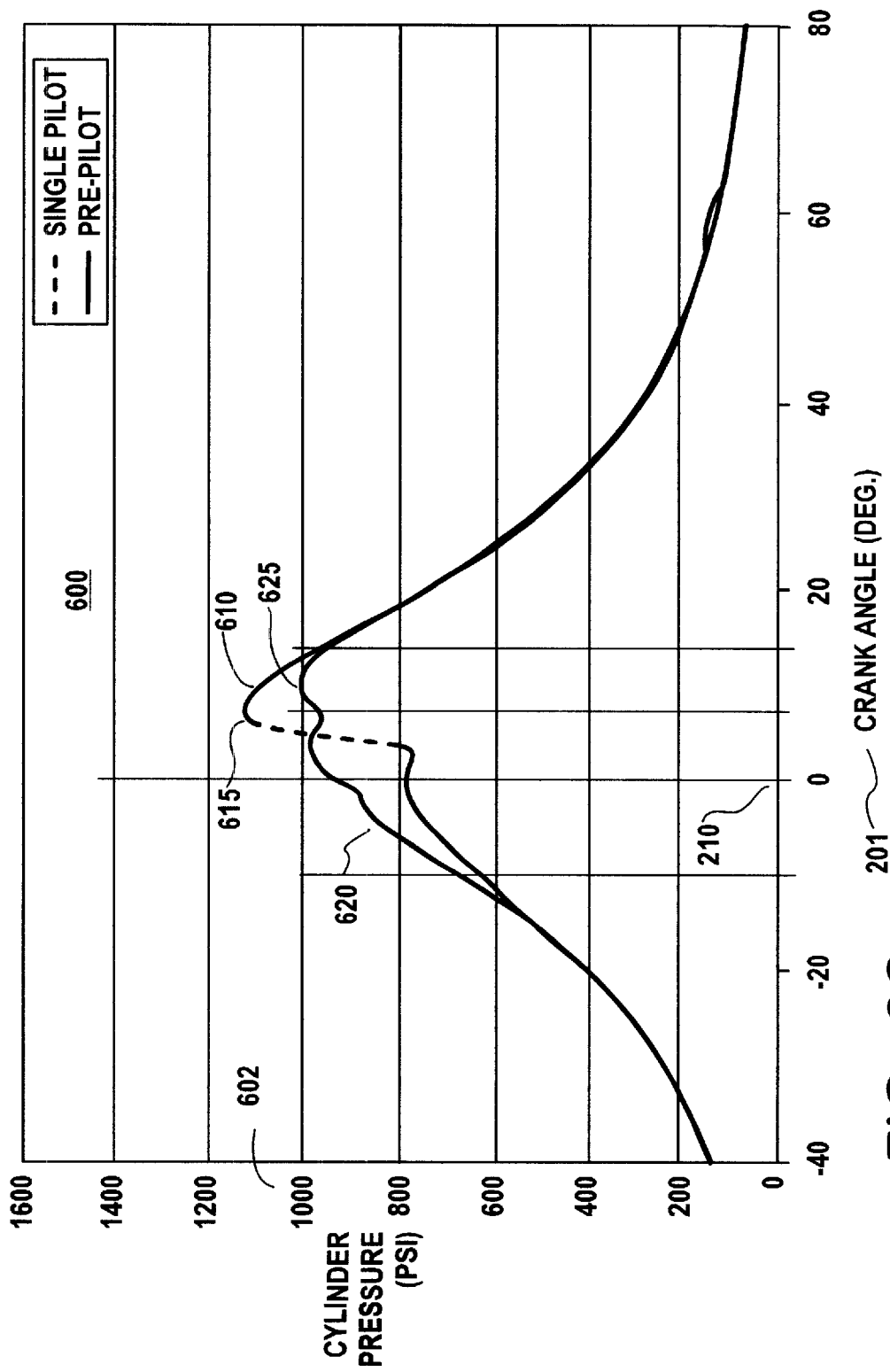
FIG. 3C shows an exemplary plot depicting cylinder pressure curves at 800 rpm and 100 ft-lb. for an embodiment of the pre-pilot, pilot, and main fuel injection of the present invention and for a pilot and main fuel injection.

FIG. 3C illustrates an exemplary plot 600 depicting combustion chamber or cylinder pressure curves 610 and 620 that, as before, result in a combustion chamber from the typical single pilot/main injection method of the prior art, and the pre-pilot 225, pilot 215 and main injection 205 method of the present invention. As in the other curves, the pre-pilot injection 225 was injected at 70° BTDC, pilot injection 215 was injected at 25° BTDC and the main injection 205 was injected at about TDC. The resultant curves were again obtained at an engine speed and load of 800 rpm and 100 ft-lb. or engine idle conditions. But as before, the pre-pilot injection 225 method of the present invention is intended to be used at high, medium and low engine loads and speeds, as well as idle.

The single pilot cylinder pressure curve 610 (resulting from a pilot and main injection) exhibits a sharp increase in cylinder pressure compared to the pre-pilot cylinder pressure curve 620 (resulting from a pre-pilot, pilot and main injection). For example, the single pilot cylinder pressure curve 610 exhibits a cylinder pressure of about 800 (Psi) at the TDC point 210 and a maximum cylinder pressure of about 1100 (Psi) at approximately 10° ATDC, and then a subsequent gradual decrease to about 800 (Psi) at about 20° ATDC. In contrast, the pre-pilot cylinder pressure curve 620 shows a significantly smoother increase in cylinder pressure increase over the same crank angle range, i.e., between TDC 210, and 5 & 10° ATDC. In fact, the pre-pilot cylinder pressure curve 620 indicates that the cylinder pressure had been gradually increasing prior to TDC 210 due to the controlled combustion of the pre-pilot injection after the critical mass point was achieved.

As before, a variation in the cylinder pressure was expected when the main injection is delivered into the combustion chamber for a power stroke, as is shown in FIG. 2A. However, there is a sharp reduction in the cylinder pressure rise between the pilot cylinder pressure curve 610 and the pre-pilot cylinder pressure curve 620 of the present invention. In comparison to the single pilot cylinder pressure curve 610, the delivery of a pre-pilot injection 225 during the compression stroke and before the pilot injection 215 has dramatically reduced the pressure rise in the combustion chamber as the piston therein travels from TDC 210 to about 10° ATDC, i.e., during the power stroke.

Thus, using a pre-pilot injection, as contemplated by the present invention, actually results in a smoother and more controlled cylinder pressure rise from about 900–950 (psi) at about TDC 210 to about 1000 (psi) at about 10° ATDC. This is a change of about 50 to 100 psi over a crank angle range of about 10°. In contrast, without the pre-pilot injection, i.e., only a pilot/main injection, there results a maximum cylinder pressure rise of about 300 (Psi) between TDC 210 (at 800 Psi) and about 5–7° ATDC (at 1100 Psi). The significant reduction in cylinder pressure rise is obtained by the addition of a pre-pilot injection. Again, the injected pre-pilot fuel burns in the combustion chamber in a non-explosive and controlled manner such that the heat release rate is reduced. The reduced heat release rate in turn results in a reduced pressure increase rate. The reduced pressure increase rate in turn results in a smoother and controlled rise in the cylinder pressure as the piston transitions from the compression stroke to the power stroke. As before, the smoother cylinder pressure rise in turn results in reduced combustion noise (shown and discussed in FIG. 3D).

Additionally, the peak cylinder pressure 625 of the pre-pilot injection method curve 620 is substantially lower than the peak cylinder pressure 615 of the prior art single pilot method curve 610 by about 10%. A reduction of the peak cylinder pressure on this order would be typical for other engine load conditions including peak torque and rated power. Thus, peak cylinder pressure is substantially reduced when pre-pilot injection is used. Since the peak cylinder pressure is a major determinant of the structural design of an engine, the invention provides the further advantage that, in existing engines, the power output or power density may be increased without a structural penalty and new engines may be designed with a reduced strength lighter weight structure for the same power output or power density.

Figure 3D:
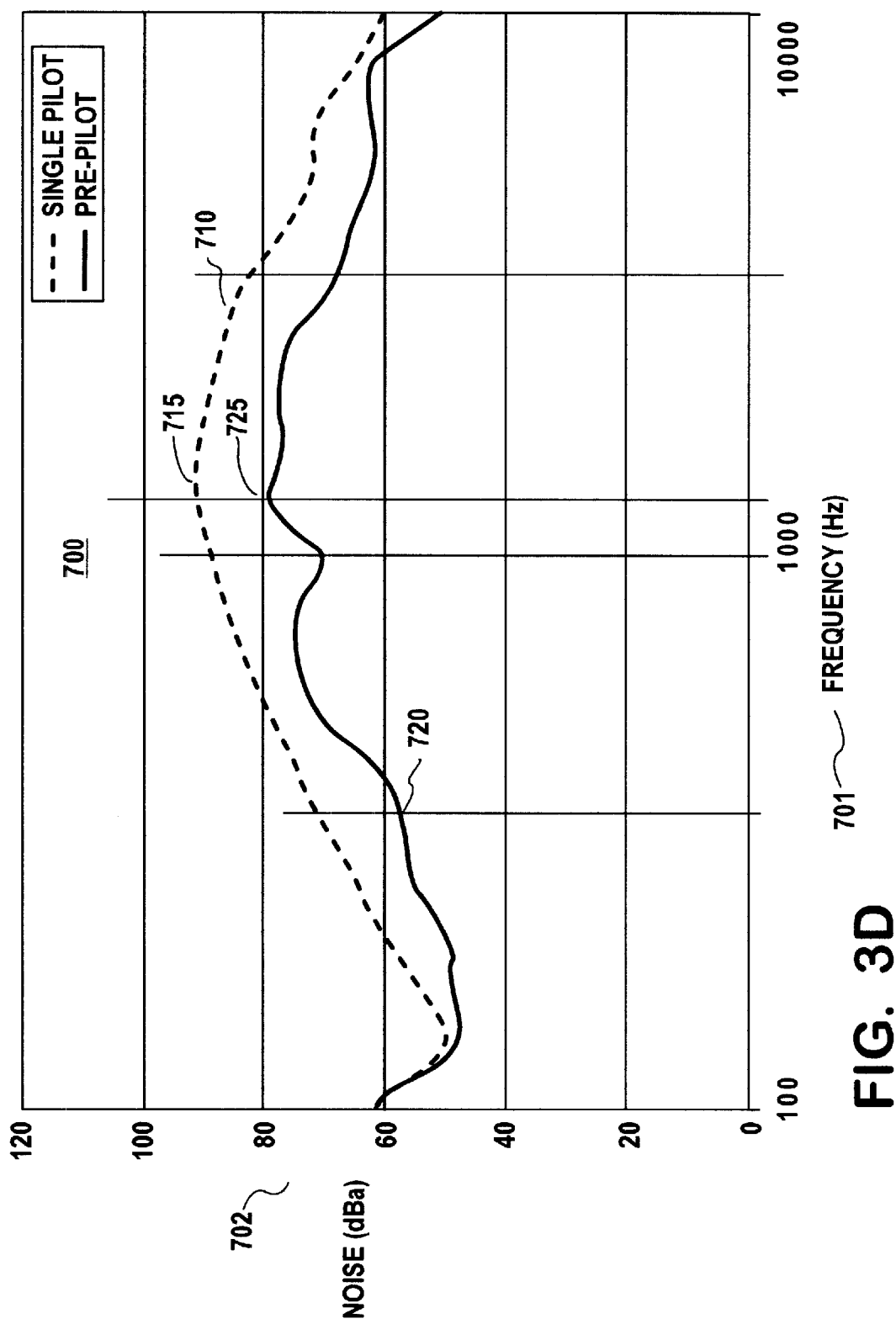
FIG. 3D shows an exemplary plot depicting combustion noise curves at 800 rpm and 100 ft-lb. for an embodiment of the pre-pilot, pilot, and main fuel injection of the present invention and for a pilot and main fuel injection.

FIG. 3D illustrates an exemplary plot 700 depicting a comparison of combustion chamber or cylinder pressure noise curves 710 and 720 that result from both the typical single pilot/main injection method, and the pre-pilot 225, pilot 215 and main injection 205 method of the present invention. The resultant noise curves 710 and 720 were obtained at an engine speed and load of 800 rpm and 100 ft-lb. or engine idle conditions. As before, the pre-pilot injection 225 method of the present invention can be used at high, medium and low engine loads and speeds, as well as idle.

The single pilot combustion chamber noise curve 710 (resulting from a pilot and main injection) generally exhibits higher noise levels (in dBa) compared to the pre-pilot combustion chamber noise curve 720 (resulting from a pre-pilot, pilot and main injection) over a 1–10,000 Hertz (Hz) frequency range. Using a pre-pilot injection, as contemplated by the present invention, generally results in lower combustion noise levels over a 1–10,000 Hz. frequency rage. In this range, the pre-pilot combustion noise curve 720 has a maximum noise level of about 79 dBa at just above 1000 Hz. In contrast, without the pre-pilot injection, i.e., only a pilot/main injection, there results a maximum noise level of about 90 dBa at the same frequency. In fact, the noise curve 710 and 720 clearly indicate that noise levels of the pre-pilot noise combustion noise curve 720 is generally about 10 dBa lower than the pilot noise curve 710. This sharp reduction in combustion noise levels is obtained through the addition of the pre-pilot injection of the present invention.

The resultant reduced combustion noise levels were a result of providing a homogenous air/fuel mixture by the injection of a pre-pilot shot in the pre-pilot window 230 prior to the pilot and main injections and providing a pilot injection at about the point where a critical mass of the pre-pilot quantity would otherwise occur to quench the pre-pilot mixture and delay the achievment of the critical mass. The injected pre-pilot fuel also influences the combustion of the pilot and main injections in the combustion chamber so that the entire combustion cycle occurs in a more controlled manner such that the heat release rate is reduced. The reduced heat release rate in turn results in a reduced pressure increase rate. The reduced pressure increase rate in turn results in a smoother and more controlled rise in the cylinder pressure as the piston transitions from the compression stroke to the power stroke. Finally, the smoother cylinder pressure rise results in reduced combustion noise as depicted in FIG. 3D, which is an engine parameter which is very easily sensed by any person.

Figure 4:
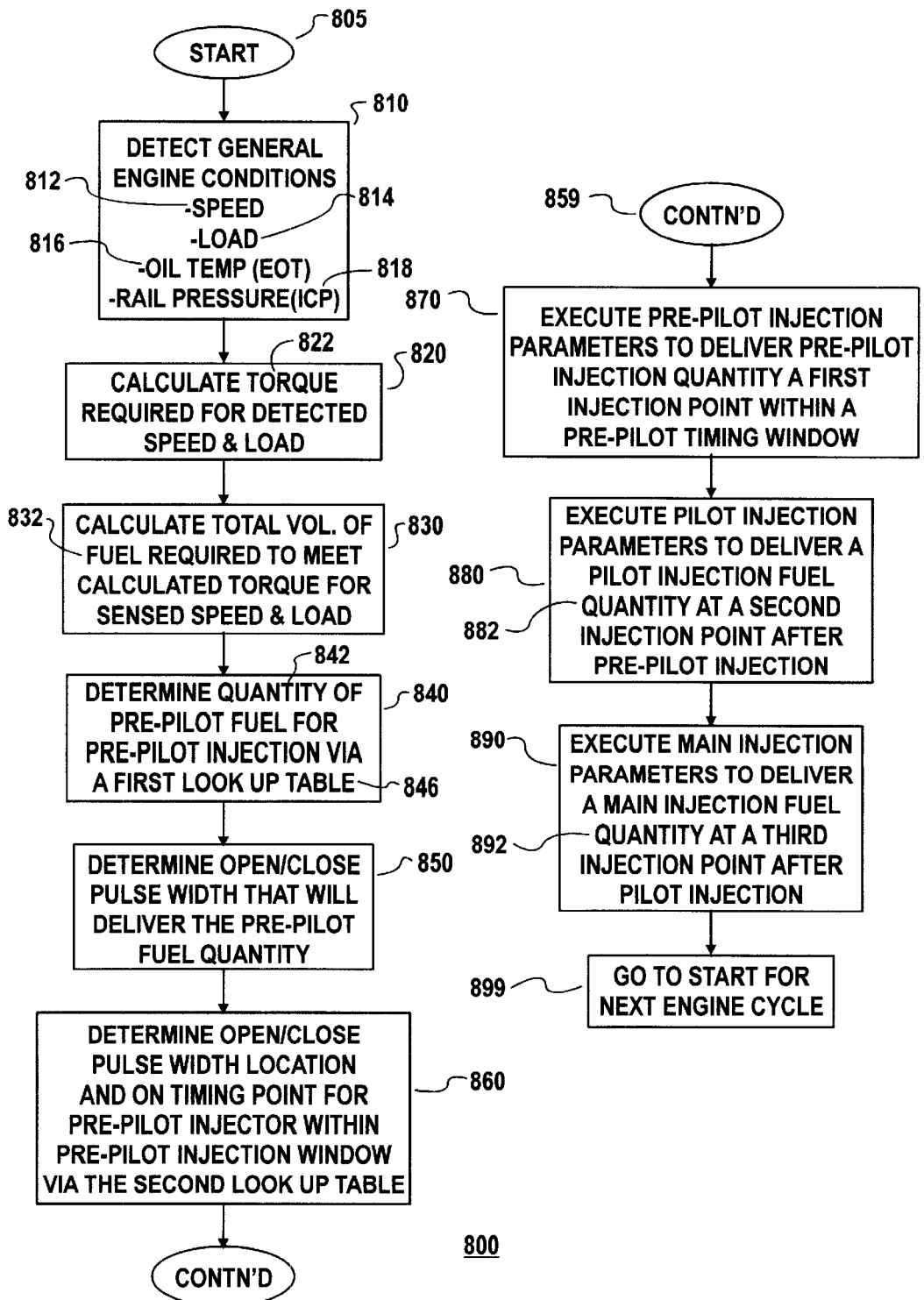
FIG. 4 shows a flow diagram illustrating an exemplary process of determining parameters for a pre-pilot, pilot, and main fuel injection in accordance with an embodiment of the present invention.

FIG. 4 shows a diagram illustrating an exemplary process of determining parameters for the delivery of a pre-pilot injection in accordance with the present invention to obtain reduced combustion noise levels. In step 805, it is determined that that a pre-pilot injection 225 (shown in FIG. 2A) is to be made and therefore appropriate pre-pilot injection parameters must be determined or calculated. In a preferred embodiment, it is the ECM 124 (shown in FIG. 1) that is makes this determination, however any other similar computer medium can be used, e.g., a personal computer, a lap top computer.

In step 810, the engine's operating condition are sensed or detected. The engine parameters sensed should include at least the engine speed 812, engine load 814, engine oil temperature (EOT) 816 and the rail pressure or injection control pressure (ICP) 818. In step 820, the torque 822 required to meet the sensed engine speed 812 and load 814 is calculated.

In step 830, a total volume of fuel required or desired 832 is calculated. The total volume of fuel 832 will the total amount of fuel, to be injected into the combustion chamber, that will meet the required torque 822 for a corresponding engine speed 812 and load 814.

In step 840, a pre-pilot fuel quantity 842 is determined for a given engine speed 812 and load 814. Based on the EOT 816, the total volume of fuel desired 832, and rail pressure or injection control pressure (ICP), a first basic engine look up table 846 is used to determine how much of the total volume of fuel desired 832 is to be used or distributed in the pre-pilot injection. This smaller amount of fuel is the pre-pilot fuel quantity. The basic engine look up table used will be based on the particular sensed engine speed 812 and load 814. Basic engine look up tables are well know by those skilled in the art. In a preferred embodiment, it is the ECM 124 that is reading sensed engine operation parameters, making calculation and determining values from the look up tables.

In step 850, injector pre-pilot OPEN/CLOSE pulse widths (shown in FIG. 2B) are now determined since the pre-pilot fuel quantity 842 and injection rail pressure or injection control pressure 818 are known. The pre-pilot OPEN and CLOSE pulse widths 338 and 334 will be such that the injector 10 (shown in FIG. 1) will deliver the calculated amount of pre-pilot fuel quantity 842 during the pre-pilot injection.

In step 860, a timing determination is now made as to where within an predetermined pre-pilot injection window 230 (shown in FIG. 2A) the OPEN/CLOSE pulse widths 338 and 334 should initiated. In a preferred embodiment, the pre-pilot injection window is a crank angle range of about 90° to 40° BTDC. Further, a determination is also made as to the particular pre-pilot injection point or timing 224, within the pre-pilot injection window 230, where the pre-pilot fuel quantity 842 will be delivered into the combustion chamber. The ECM 124 will optimally determine the injection point or timing 224 such that combustion noise is minimized.

The determination of where to locate the pre-pilot injection point 224 and the OPEN and CLOSE pulse widths 338 and 334, within the pre-pilot injection window 230, is made through a second basic engine look up table 866. The second basic engine look up table 866 determines these parameters based on the pre-pilot fuel quantity 842, rail pressure or injection control pressure (ICP), and engine speed 812 & load 814. As before, basic engine look up tables are well know by those skilled in the art. In a preferred embodiment, it is the ECM 124 that is making calculations and determining values from the look up tables.

In step 870, the now known pre-pilot injection parameters are used to execute the delivery of a pre-pilot fuel injection 225 into the combustion chamber within the pre-pilot injection window 230.

In step 880, after the pre-pilot injection 225 has been made, another second process is carried out such that the typical pilot injection 215 is delivered subsequent to the pre-pilot injection 225 at a second injection or timing point 216 from top dead center 210 which is preferably located at about the point where the pre-pilot mixture would reach critical mass, as explained above.. The determination of how much pilot fuel 892 to deliver in the pilot injection 215, and when, is analogous to the process described in steps 805 through 880 for the pre-pilot injection 225. As with the pre-pilot fuel quantity 842, the pilot fuel 882 will be a portion of the total volume of fuel desired 832.

In step 890, after the pilot injection 215 has been made, a third process is carried out such that the typical main injection 205 is delivered subsequent to the pre-pilot injection 215 at a third injection or timing point 204 from top dead center 210. The fuel quantity 892 to be delivered in the main injection 205 is the total volume of fuel required 832 minus the pre-pilot fuel quantity 842 and the pilot fuel quantity 882. The determination of when to deliver the main injection 205 is analogous to the process described in steps 805 through 880 for the pre-pilot injection 225. Finally, in step 899, the pre-pilot injection process 800 is repeated for the next engine cycle.

FIG. 4 shows a diagram illustrating an embodiment of pre-pilot injection algorithm. The pre-pilot injection algorithm is preferably stored and executed by the engine control module (ECM) discussed in FIG. 1. However, those of skill in the art will readily recognize that the pre-pilot injection method/process may alternatively be stored on any type of memory storage device that be accessed by an ECM. Further, the pre-pilot injection algorithm may be executable by any well known computer medium with a controller or microprocessor, similar to those found in typical ECMs.

It should be understood that the present invention has been described herein with reference to specific exemplary embodiments. It will be apparent to those skilled in the art that a person understanding this invention may conceive of changes or other embodiments or variations, which utilize the principles of this invention without departing from the broader spirit and scope of the invention as set forth in the claims. All are considered within the sphere, spirit and scope of the invention. The specification and drawings are, therefore, to be regarded in an illustrative rather than restrictive sense. Accordingly, it is not intended that the invention be limited except as may be necessary in view of the claims as set forth herein.

What is claimed is:

1. In an internal combustion engine having a fuel injection cycle during a single engine cycle that includes pilot and main fuel injections, a method for reducing a heat release rate in a combustion chamber, the method comprising the steps of:

sensing at least one engine operating parameter;

executing a pre-pilot injection algorithm;

injecting a pre-pilot fuel quantity into at least one combustion chamber at a first crank angle from top dead center and providing vaporization and homogenous mixing of the pre-pilot fuel quantity prior to said pilot injection under cylinder conditions preventing an explosive combustion of the pre-pilot fuel quantity.

2. The method of claim 1, wherein the first crank angle is further based upon the desired pre-pilot fuel quantity and the injection rail pressure.

3. In an internal combustion engine having an injection cycle that includes both pilot and main fuel injections, a method for reducing a pressure increase rate in a combustion chamber, the method comprising the steps of:

sensing at least one engine operating parameter;

executing a pre-pilot injection algorithm; and injecting a pre-pilot fuel quantity into at least one combustion chamber at a first crank angle before top dead center, resulting in vaporization, substantial homogenous mixing before a critical mass is achieved and controlled burning of the pre-pilot fuel quantity as a corresponding piston travels from a compression stroke to a power stroke.

4. The method of claim 3, wherein the engine operating parameter comprises one or more of the following: crank angle, engine speed, an engine load, engine oil temperature, and injector rail pressure.

5. The method of claim 3, wherein the said crank angle is initiated within a pre-pilot injection window wherein an earliest point in said window provides cylinder conditions wherein injected fuel is vaporized.

6. In an internal combustion engine having a fuel injection cycle that includes both pilot and main fuel injections, a method injecting fuel into a combustion chamber of the engine, the method comprising the steps of:

sensing at least one pre-pilot engine operating parameter in an engine control module;

executing a pre-pilot injection algorithm;

receiving a control signal at an injector driver, from the engine control module, in accordance with the executed pre-pilot injection algorithm;

selectively operating at least one fuel injector to deliver a pre-pilot fuel injection into a corresponding combustion chamber during a compression stroke of said engine at a first crank angle before top dead center prior to said pilot injection, said injection being made under combustion chamber conditions wherein the injection of said pre-pilot fuel would not result in a critical mass capable of explosive combustion; and mixing the pre-pilot fuel and the air in the combustion chamber to form a substantially homogenous air fuel mixture in the combustion chamber prior to critical mass conditions existing in said combustion chamber.

7. The method of claim 6 wherein said pilot injection is injected at or before the existence of said critical mass conditions based on said pre-pilot fuel, said pilot injection quantity being sufficient to delay the achievement of said critical mass conditions.

8. The method of claim 6, wherein the pre-pilot engine operating parameter comprises at least one of crank angle, engine speed, engine load, engine oil temperature, and injector rail pressure.

9. The method of claim 8, wherein the pre-pilot injection window comprises a range between 40° and 90° before top dead center.

10. The method of claim 6, wherein the pre-pilot injection is initiated within a pre-pilot injection window wherein an earliest point in said window provides cylinder conditions wherein injected fuel is vaporized and a latest point in said window provides sufficient time for the injected fuel attain substantial homogenous mixing before said critical mass conditions occur.

11. In an internal combustion engine having a fuel injection cycle that includes pilot and main fuel injections, a method for reducing a heat release rate in a combustion chamber comprising the steps of:

sensing at least one pre-pilot engine operating parameter in an engine control module;

executing a pre-pilot injection algorithm;

receiving a control signal at an injector driver, from the engine control module, in accordance with the executed pre-pilot injection algorithm; and selectively operating at least one fuel injector to deliver a pre-pilot fuel injection into a corresponding combustion chamber at a crank angle before top dead center prior to said pilot injection, said injection being made under combustion chamber conditions wherein the injection of said pre-pilot fuel would not result in a critical mass capable of explosive combustion; and mixing the pre-pilot fuel and the air in the combustion chamber to form a substantially homogenous air fuel mixture in the combustion chamber prior to critical mass conditions existing in said combustion chamber thereby providing a controlled heat release rate.

12. The method of claim 11 wherein said pilot injection is injected at or before the existence of said critical mass conditions based on said pre-pilot fuel, said pilot injection quantity being sufficient to delay the achievement of said critical mass conditions.

13. The method of claim 11, wherein the pre-pilot engine operating parameters comprise at least one of the following: crank shaft angle, engine speed, engine load, engine oil temperature, and injector rail pressure.

14. The method of claim 11, wherein the first distance is initiated within a pre-pilot injection window wherein an earliest point in said window provides cylinder conditions wherein injected fuel is vaporized and a latest point in said window provides sufficient time to attain substantial homogenous mixing before said critical mass conditions occur.

15. The method of claim 14, wherein the pre-pilot injection window comprises a range between 40° and 90° before top dead center.

16. In an internal combustion engine having a fuel injection cycle that includes a pilot injection and a main injection for injecting fuel into a combustion chamber of an engine cylinder, a method for determining a pre-pilot fuel quantity and timing for a pre-pilot injection prior to the pilot injection, the method comprising the steps of:

sensing at least one engine operating parameter;

calculating a torque requirement from the sensed operating parameter;

calculating a total volume of fuel required to meet the torque requirement;

determining a pre-pilot fuel quantity, based upon the operating parameter, through a first look up table;

determining a pre-pilot injection timing point through a second look up table, said pre-pilot injection occurring under combustion chamber conditions wherein the injection of said pre-pilot fuel would not result in a critical mass capable of explosive combustion;

determining an injection open pulse width through the second look up table; and determining an injection close pulse width through the second look up table;

whereby the pre-pilot injection in combination with a pilot and a main injection, results in a controlled cylinder pressure rise as a corresponding piston travels from the compression stroke to a power stroke.

17. The method of claim 16, wherein the engine operating parameter comprises one or more of the following: crank angle, engine speed, engine load, engine oil temperature, and injector rail pressure.

18. The method of claim 17, wherein the injection timing point is based upon a desired pre-pilot fuel quantity and injection rail pressure.

19. The method of claim 18, wherein the injection timing point is within a pre-pilot injection window providing conditions in the combustion chamber for forming a homogenous air fuel mixture prior to attaining critical mass conditions conducive to explosive combustion of said pre-pilot fuel.

20. The method of claim 19, wherein the pre-pilot injection window comprises a range between 40° and 90° before the top dead center.

21. In an internal combustion engine having a fuel injection cycle that includes a pilot injection and a main injection, a method for injecting fuel into a combustion chamber of the engine, the method comprising the steps of:

sensing at least one engine operating parameter;

executing a pre-pilot injection algorithm;

selectively operating at least one fuel injector to deliver a pre-pilot fuel quantity into a corresponding combustion chamber at a first crank angle before top dead center prior to said combustion chamber having pressure and temperature conditions which would provide explosive combustion upon injection of the pre-pilot fuel quantity mass;

selectively operating at least one fuel injector to deliver a pilot fuel quantity into a corresponding combustion chamber at or before a second crank angle before top dead center subsequent to the pre-pilot injection, said second crank angle being predetermined to correspond to the existence of a critical mass based on said pre-pilot fuel quantity; and selectively operating at least one fuel injector to deliver a main fuel quantity into a corresponding combustion chamber subsequent to the pilot injection.

22. The method of claim 21 wherein said pilot injection is injected at or before the existence of said pressure and temperature conditions, said pilot injection quantity being sufficient to delay the achievement of said conditions.

23. The method of claim 22 wherein said delay in said the controlled increase in pressure in the chamber pressure correlates to a reduced heat release rate due to the pre-pilot injection.

24. The method of claim 21 wherein the engine operating parameter is sensed by an electronic control module and comprises at least one of the following: crank angle, engine speed, engine load, engine oil temperature, and injector rail pressure.

25. The method of claim 24, wherein the first crank angle is determined based upon the desired pre-pilot fuel quantity and the injection rail pressure.

26. The method of claim 22, wherein the first crank angle is within a predetermined pre-pilot injection window wherein an earliest point in said window provides cylinder conditions wherein injected fuel is vaporized and a latest point in said window provides sufficient time for the injected fuel to form a substantially homogenous mixture before said pilot injection occurs.

27. The method of claim 26, wherein the pre-pilot injection window comprises a range between 90° and 40° before top dead center.

28. The method of claim 27, wherein the crank angle is located within a pre-pilot injection window wherein an earliest point in said window provides cylinder conditions wherein injected fuel is vaporized and a latest point in said window provides sufficient time for the injected fuel to be vaporized and homogenously mixed before ignition of said fuel.

* * * * *